Patented Oct. 31, 1922.

1,433,666

UNITED STATES PATENT OFFICE.

GERHARD STALMANN, OF DUSSELDORF-OBERKASSEL, GERMANY.

MANUFACTURE OF P-CYMOL.

No Drawing.  Application filed September 4, 1919. Serial No. 321,718.

*To all whom it may concern:*

Be it known that I, GERHARD STALMANN, a citizen of Germany, and residing at 118 Wildenbruchstreet, Dusseldorf - Oberkassel, Germany, have invented a new and useful Improvement in the Manufacture of P-Cymol; I have made application in Germany, July 9, 1917; and I do hereby declare the following to be a full, clear, and exact description of the same.

The present invention refers to the manufacture of p-cymol from terpenes.

Naudin has described (Bulletin de la société de chimie, volume 37 (1882) (page 111)) that one obtains by the action of chlorine on pinene at ordinary temperature a dichloride, which, if being heated, splits off 2 molecules of hydrochloric acid and gives p-cymol. In fact however one does not obtain any essential traces of p-cymol, but a large amount of pinenehydrochloride and heavy oils, the chemical character of which cannot be ascertained.

The present process for manufacturing p-cymol from terpenes consists in subjecting terpenes boiling between about 160 and 175° centigrade to the action of chlorine and heating the chlorinated product.

Suitable terpenes are those obtained as waste products in the manufacture of camphor, having a boiling point of about 175° centigrade or the fractions of similar boiling point of Swedish, Polish and other turpentine oils (pine oils). Other suitable terpenes are those boiling at 160° centigrade and obtained from the cited turpentine oils by distillation. It is suitable to treat the turpentine oils before subjecting them to the action of chlorine with organic or inorganic acids or organic acids or salts having an acid reaction.

The action of chlorine may be effected in the presence of catalyzers, for instance iron chloride, metallic iron, antimony chloride, etc.

The chlorinated terpenes are heated. One may carry out this operation by distilling the chlorinated terpenes by means of steam. The heating or distilling operation may be carried out in the presence of small amounts of substances having polymerizing action for instance chloride of zinc, zinc dust, cuprous chloride, etc. One obtains an amount of p-cymol corresponding to about 60 percent of the theoretical output. If one treats the turpentine oil fractions before the action of chlorine with substances of acid reaction one obtains a higher output of p-cymol, about 75 percent of the raw material.

Schweizer (Liebigs Annalen volume 40 page 333) has described the action of chlorine on carvene, without however being able to state the chemical nature of the obtained products. One has already prepared a dibromide from terpinene, transformed this dibromide into p-cymol (Semmler, Die ätherischen Oele vol. 2, page 419) and also transformed phellandrene by means of bromine into p-cymol (Semmler, vol. 2, page 451). The terpine oils, used according to the present invention do not contain carvene, terpinene nor phellandrene. On the other hand the known methods use exclusively bromine, the present invention however chlorine. One could not predict that the terpenes could have the same behaviour against chlorine as against bromine, because one knows that the terpenes show even against equivalents a different behaviour.

*Example I:*

One introduces gradually 10 kg chlorine into 20 kg terpenes obtained as waste products in the camphor manufacture (boiling at about 175° centigrade) at 10–80° centigrade. One distills the reaction product by means of steam, heats the distillate with a small amount of chloride of zinc and subjects it to distillation. One obtains about 12 kg nearly pure p-cymol.

*Example II:*

One introduces gradually 10 kg chlorine into 20 kg of a fraction from pine oil, having the boiling point of about 160° centigrade, at about 10–80° centigrade. One distills the reaction mass with steam, heats the distillate with zinc chloride and fractionates. One obtains about 12 kg nearly pure p-cymol.

*Example III:*

20 kg of a fraction from pine oil, having the boiling point of about 160° centigrade are heated with 10 kg formic acid of 85% at a reflux cooler for about 3 hours. The mass is washed with water, neutralised and then subjected to a distillation. The fraction of the boiling point of about 175° centigrade is then treated as in Example II.

I claim:

1. The process for manufacturing p-cymol which consists in heating terpenes boiling between about 160 and 175° centigrade with acids, subjecting the said terpenes to the action of chlorine and distilling the chlorine product.

2. The process for manufacturing p-cymol which consists in heating terpenes boiling between about 160° and 175° centigrade with substances of acid reaction, separating the substances of acid reaction subjecting the fraction of terpenes of the boiling point of about 175° centigrade to the action of chlorine and heating the chlorine product.

3. The process for manufacturing p-cymol which consists in subjecting terpenes boiling between about 160 and 175° centigrade to the action of chlorine, adding substances having polymerizing action and distilling the chlorinated product.

In testimony whereof, I have signed my name to this specification.

Dr. GERHARD STALMANN.